United States Patent [19]
Biles et al.

[11] Patent Number: 5,608,551
[45] Date of Patent: Mar. 4, 1997

[54] DISPLAY PANEL ASSEMBLY WITH MICROLENS STRUCTURE

[75] Inventors: Jonathon R. Biles, Portland; Arlie R. Conner, Tualatin, both of Oreg.

[73] Assignee: In Focus Systems, Inc., Wilsonville, Oreg.

[21] Appl. No.: 415,753

[22] Filed: Apr. 3, 1995

Related U.S. Application Data

[63] Continuation of Ser. No. 46,219, Apr. 12, 1993, abandoned.
[51] Int. Cl.$^6$ .................... G02F 1/1335; G02F 1/1347
[52] U.S. Cl. ............................... 359/95; 349/74
[58] Field of Search .................... 359/40, 41, 53, 359/48, 54, 619, 621, 622; 345/32

[56] References Cited

U.S. PATENT DOCUMENTS

| | | | |
|---|---|---|---|
| 4,917,465 | 4/1990 | Conner et al. | 359/53 |
| 5,050,965 | 9/1991 | Conner et al. | 359/73 |
| 5,052,783 | 10/1991 | Hamada | 359/40 |
| 5,083,854 | 1/1992 | Zampolin et al. | 359/40 |
| 5,126,863 | 6/1992 | Otsuka et al. | 359/41 |
| 5,148,297 | 9/1992 | Ishii et al. | 359/53 |
| 5,187,599 | 2/1993 | Nakanishi et al. | 359/41 |
| 5,315,418 | 5/1994 | Sprague et al. | 359/53 |
| 5,329,388 | 7/1994 | Yoshimizu | 359/42 |

FOREIGN PATENT DOCUMENTS 0451681  10/1991  European Pat. Off. ............ 359/63

*Primary Examiner*—William L. Sikes
*Assistant Examiner*—Tai V. Duong
*Attorney, Agent, or Firm*—Stoel Rives LLP

[57] ABSTRACT

The present invention includes a matrix display panel assembly (10) having at least two face-to-face matrix display panels (20) that each define an array of pixel components (28) through which light is directed to form a display image. A microlens panel (32, 34) is positioned between the pair of matrix display panels. The microlens panel includes an array of microlenses that receive light propagating through the pixel components of one of the matrix display panels and directs the light through the pixel components of the other matrix display panel. As a result, the panel assembly has improved light transmission capabilities with reduced parallax and depth of field requirements.

17 Claims, 2 Drawing Sheets

DISPLAY PANEL ASSEMBLY WITH MICROLENS STRUCTURE

This is a continuation of application Ser. No. 08/046,219, filed Apr. 12, 1993, now abandoned.

TECHNICAL FIELD

The present invention relates to matrix display panel assemblies employing multiple successive matrix display panels and, in particular, to improving the light transmission and viewing characteristics of such panel assemblies.

BACKGROUND OF THE INVENTION

Matrix-addressed display systems such as, for example, liquid crystal displays, electroluminescent displays, and plasma displays, include a matrix display screen on which an array of pixels is defined by overlapping electrodes or other electrical or electronic components. A display image is typically formed by activating selected pixels, thereby generating light at the selected pixels or allowing light to pass through them.

Many display panel assemblies include two or three matrix display panels that are stacked together so that display images with multiple colors can be formed. Each matrix display panel defines pixel components that control or generate light of a selected color or group of colors. Pixel components from the different matrix display panels multiply by series transmission to form each of the colored pixels in the array.

In a liquid crystal display, for example, the pixel components are formed by a liquid crystal layer positioned between a pair of glass plates. The liquid crystal layer is typically much thinner than the glass plates. The glass plates of the separate display panels establish distances between the pixel components. These distances are typically greater than the lateral dimensions of the pixel components.

Such stacked matrix display panels can suffer relatively low light transmission capabilities. In particular, it can be difficult to maintain collimation of the light as it passes through successive pixel components. As a result, light rays passing through one pixel component tend to be misaligned with subsequent pixel components and, therefore, blocked by opaque regions of the subsequent display panels.

Another undesirable characteristic of many stacked matrix display panel assemblies is parallax. Parallax can occur because the thickness of the glass plates is so comparatively large that the alignment of the pixel components of a pixel can appear to change when the display screen is viewed from different angles. In a multicolor stacked arrangement, changes in the alignment of the pixel components can cause the color of a pixel to have an undesirable dependence on viewing angle. Moreover, the comparatively long optical paths between the stacked pixel components require a relatively large depth of field in, for example, projection display systems. Such a depth of field can be difficult to accommodate because it requires a light source with a small solid angular extent, as viewed from the liquid crystal display.

SUMMARY OF THE INVENTION

An object of the present invention is, therefore, to provide a stacked matrix display panel assembly.

Another object of this invention is to provide such a panel assembly with improved light transmission capabilities.

A further object of this invention is to provide such a panel assembly with reduced parallax and depth of field requirements.

The present invention includes a matrix display panel assembly having at least two face-to-face matrix display panels having stacked pixel components that define an array of pixels through which light is directed to form a display image. In a preferred embodiment, a microlens panel is positioned between each pair of matrix display panels. The microlens panel includes an array of microlenses that receive light propagating through the pixel components of one of the matrix display panels and directs the light through the pixel components of the other matrix display panel. As a result, the panel assembly has improved light transmission capabilities with reduced parallax and depth of field requirements. The improvements in parallax and depth of field requirements occur because light from each pixel component is imaged or focused toward successive pixel components by the microlenses.

Additional objects and advantages of the present invention will be apparent from the detailed description of the preferred embodiment thereof, which proceeds with reference to the accompanying drawings.

DETAILED DESCRIPTION OF PREFERRED EMBODIMENT

Figure 1:
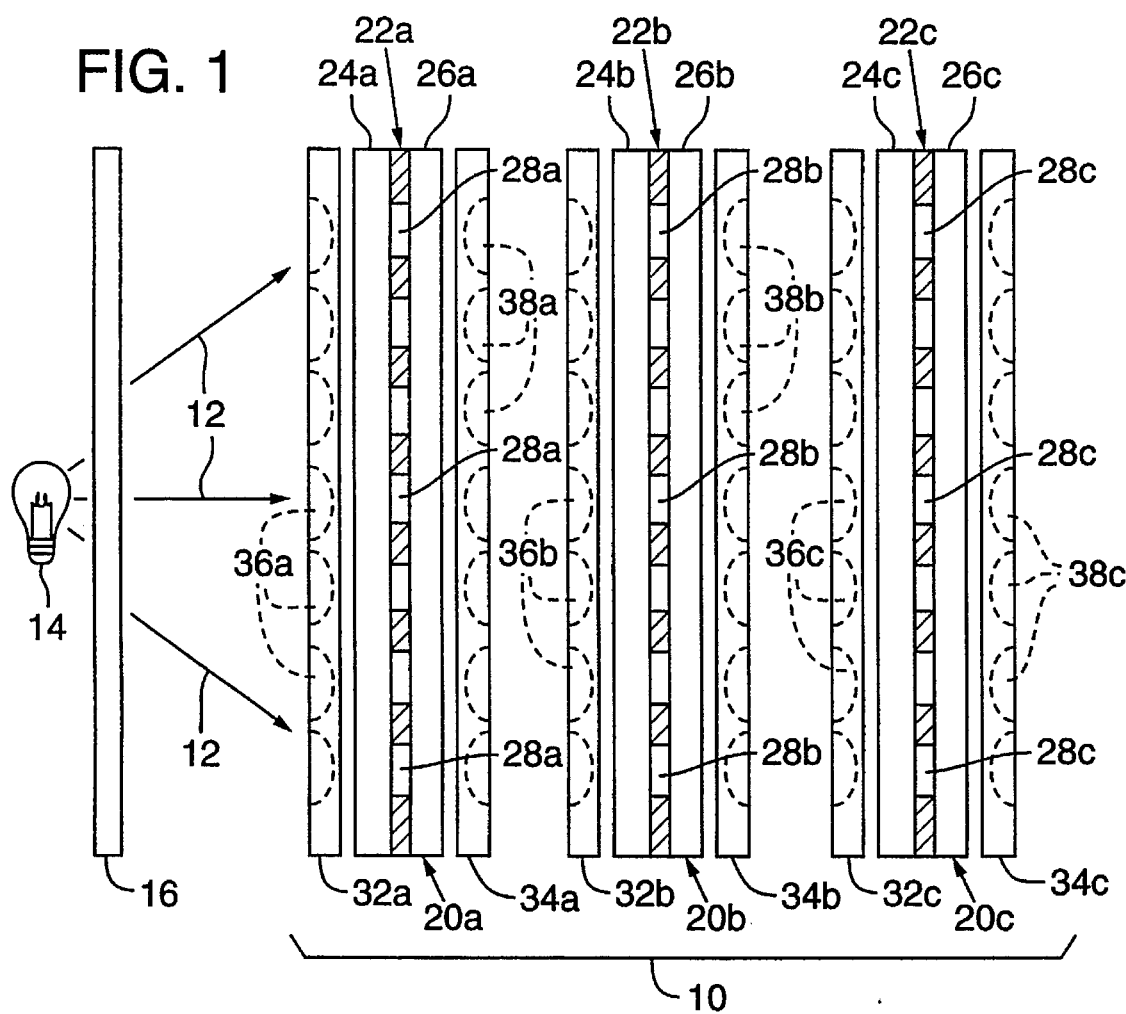
FIG. 1 is a simplified exploded schematic side view of a matrix display panel assembly of the present invention.
Figure 2:
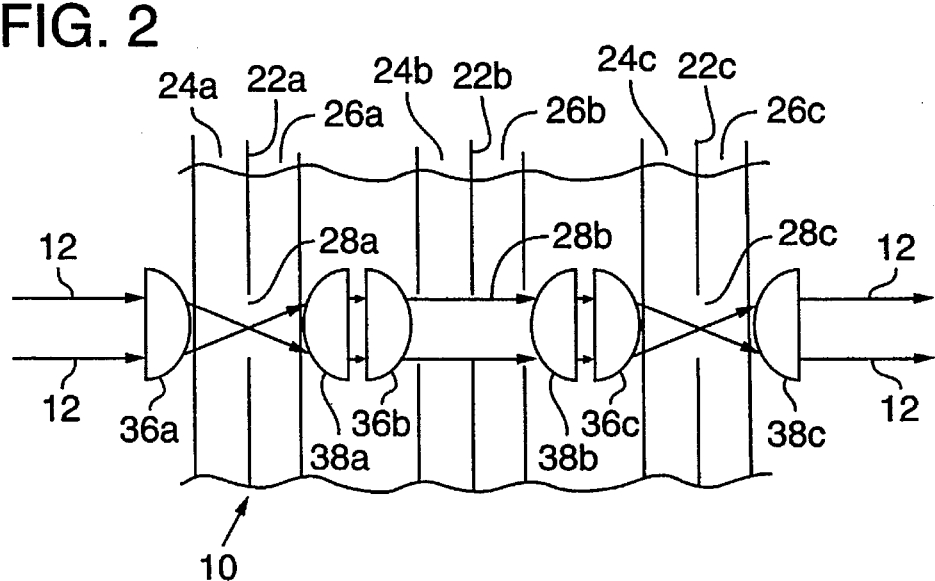
FIG. 2 is an enlarged simplified schematic side view of components corresponding to a single pixel in the panel assembly of FIG. 1.

With reference to FIGS. 1 and 2, a matrix display panel assembly 10 of the present invention receives light 12 from a light source 14 via a Fresnel lens 16. Light source 14 preferably includes an arc lamp with a relatively small angular extent of, for example, 5 degrees full angle when viewed from panel assembly 10.

Panel assembly 10 includes three successive display panels 20a, 20b, and 20c that are separately responsive to a controller (not shown) to form multicolor display images in a manner described, for example, in U.S. Pat. No. 4,917,465 of Conner et al. Display panels 20a, 20b, and 20c are generally the same and have common features and associated components that are differentiated by the respective suffices a, b, and c. The following description is directed primarily to display panel 20b but is similarly applicable to display panels 20a and 20c. Elements referred to individually with suffices are sometimes referred to generally without the suffices.

Display panel 20b preferably includes a layer 22b of liquid crystal material positioned between a pair of opposed glass plates 24b and 26b to form a two-dimensional array of pixel components 28b. Display panel 20b could include any number of pixel components 28b, would typically include a large number of them (e.g., 480× 640), and is simplified to show only seven pixel components 28b in section. Liquid crystal material 22b can include various liquid crystal configurations, such as twisted nematic or supertwisted nematic, and passive electrodes or active electrode elements, such as thin film transistors. Moreover, display panels 20a, 20b, and 20c would typically include various dichroic polarizers (not shown) as described, for example, in U.S. Pat. No. 4,917,465 of Conner et al.

A pair of microlens structures or panels 32b and 34b are positioned on opposite sides of display panel 20b in face-to-face relation to respective glass plates 24b and 26b. Microlens panels 32b and 34b are generally the same and include arrays of microlenses 36b and 38b, respectively.

Microlenses 36b and 38b are aligned with the pixel components 28b formed by display panel 20b. Microlenses 36b and 38b may be formed as physical structures on panels 32b and 34b or as diffused areas of refractive change within the panels, as is known in the art. Microlens panels 32b and 34b are available, for example, as a planar microlens array from Nippon Sheet Glass of Tsukuba, Japan.

With particular reference to FIG. 2, microlenses 36b and 38a cooperate to collimate light 12 so it passes through pixel components 28b of display panel 20b. Microlenses 36c and 38b cooperate to converge light 12 so it passes through pixel components 28c of display panel 20c. Microlenses 36a function to converge light 12 so it passes through pixel components 28a. Microlenses 38c function to collimate light 12 as it passes from pixel components 28c for direct or projection displaying. It will be appreciated that microlenses 36b and 38a could alternatively converge light 12 to pass through pixel components 28b.

Microlens panels 32 provide panel assembly 10 with improved light transmission capabilities and reduced parallax and depth of field requirements. More specifically, microlenses 36 and 38 function to direct through the successive pixel components 28 light 12 that would otherwise be misaligned with pixel components 28 and blocked by opaque regions of the successive display panels 20.

Figure 3A:
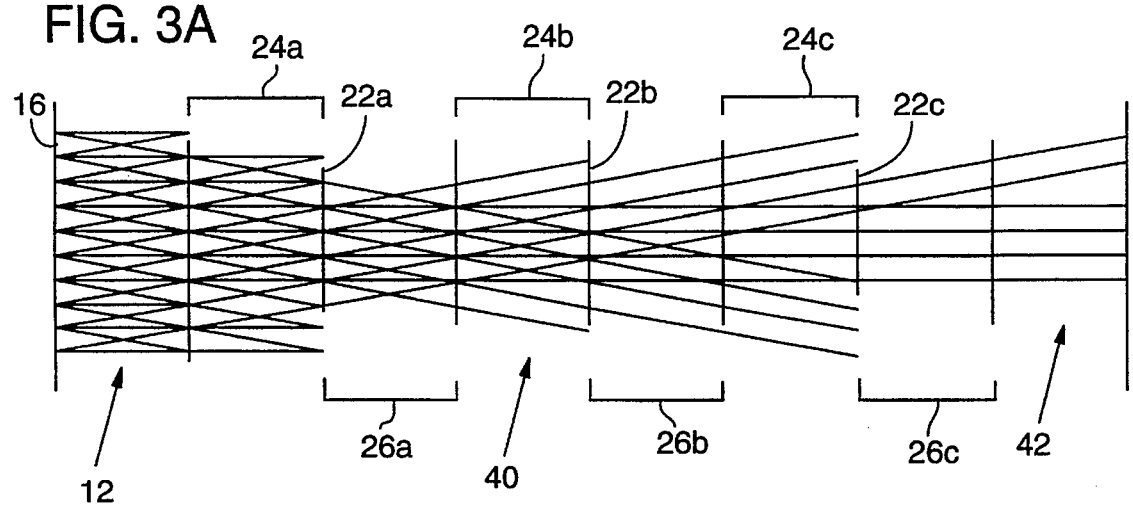
FIGS. 3A and 3B are computer-generated ray tracings representing light transmission characteristics of a single pixel of, respectively, a prior art matrix display panel assembly having no lenses and a matrix display panel assembly of the present invention.
Figure 3B:
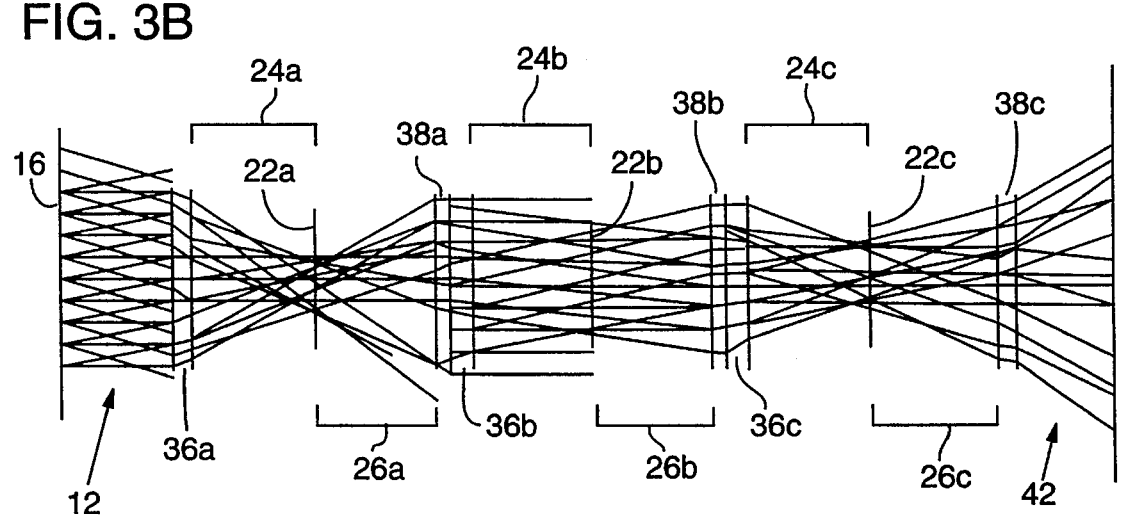

FIGS. 3A and 3B are computer-generated ray tracing models of light transmission characteristics of a single pixel in, respectively, a conventional prior art matrix display panel assembly 40 and panel assembly 10. Light 12 is shown as propagating from an imaginary plane used by the ray tracing program. For modeling purposes, panel assembly 40 includes display panels 20 without microlens arrays 36 and 38. FIGS. 3A and 3B show that for a predetermined number of input rays of light 12, panel assembly 10 of the present invention is capable of passing a significantly greater number of rays of light 42 than is prior art panel assembly 40.

More specifically, calculations based on the computer-generated ray tracing models demonstrate that panel assembly 10 transmits approximately 350% more light than prior art panel assembly 40. Similar calculations show that panel assembly 10 with microlenses 36b and 36a that converge light, as well as a panel assembly (not shown) with only microlenses 36a, also transmit more light than prior art panel assembly 40.

In addition to improved light transmission characteristics, microlens panels 32 and 34 provide improvements in parallax and depth of field requirements. These improvements occur because light from pixel components 28a and 28b is imaged or focused toward respective pixel components 28b and 28c by microlens panels 32 and 34.

The angular extent of light source 14 with an arc lamp is calculated as the arctangent of the quotient of the plasma arc diameter divided by the focal length of Fresnel lens 16. If light source 14 includes condensing optics, the plasma arc image may be somewhat magnified. In all cases, the angular extent of light source 14 as viewed from display panel 10 determines the depth of focus of the projected image.

It will be obvious to those having skill in the art that many changes may be made in the above-described details of the preferred embodiment of the present invention without departing from the underlying principles thereof. As one example, the pairs of lenses 36 and 38 between adjacent display panels 20 could be substituted with different types of lenses, such as single lenses. As another example, the outermost microlens panels 32a and 34c may be eliminated. The scope of the invention should, therefore, be determined only by the following claims.

We claim:

1. In a display panel assembly having successive first and second liquid crystal display panels with respective first and second pixel components aligned to define an array of pixels through which light is directed to form a display image, the improvement comprising:

a converging microlens structure positioned between the first and second liquid crystal display panels to enhance light transmission through the display panel assembly, the converging microlens structure including an array of microlenses in alignment with the first and second pixel components, receiving the light as it passes through the first pixel components, and having light directing properties to converge the light where it passes through corresponding ones of the second pixel components with which the first pixel components are aligned.

2. The panel assembly of claim 1 further comprising a noncoherent light source from which the light directed through the array of pixels propagates.

3. A matrix display panel assembly, comprising:

plural successive pairs of matrix display panels that define an array of pixels through which light passes to form a display image, each display panel defining pixel components of the pixels in the array; and a converging microlens structure positioned between each successive pair of matrix display panels to enhance light transmission through the display panel assembly, each microlens structure including an array of converging microlenses aligned with the array of pixels, receiving the light as it passes through its respective pair of matrix display panels, and having light directing properties to converge the light where it passes through corresponding pixel components of the matrix panels between which the microlens structure is positioned.

4. The panel assembly of claim 3 in which each matrix display panel includes a liquid crystal display panel.

5. The panel assembly of claim 3 in which each matrix display panel includes a twisted nematic liquid crystal display panel.

6. The panel assembly of claim 3 in which each matrix display panel includes a supertwisted nematic liquid crystal display panel.

7. The panel assembly of claim 3 in which each matrix display panel includes an electrically active component positioned adjacent each pixel component.

8. The panel assembly of claim 7 in which the electrically active component positioned adjacent each pixel component includes a thin film transistor.

9. The panel assembly of claim 3 further comprising a noncoherent light source from which the light directed through the array of pixels propagates.

10. A matrix display panel assembly, comprising:

first and second successive matrix display panels that include multiple pairs of respective first and second pixel components aligned to define an array of pixels through which light passes to form a display image; and a converging microlens structure positioned between the first and second matrix display panels to enhance light transmission through the display assembly, the converging microlens structure including an array of microlenses aligned with the array of pixels, receiving the light as it passes through the first pixel components, and having light directing properties to converge the light where it passes through the respective second pixel components of the multiple pairs of pixel components.

11. The panel assembly of claim 10 in which the first and second matrix display panels each include a liquid crystal display panel.

12. The panel assembly of claim 10 in which the first and second matrix display panels each include a twisted nematic liquid crystal display panel.

13. The panel assembly of claim 10 in which the first and second matrix display panels each include a supertwisted nematic liquid crystal display panel.

14. The panel assembly of claim 10 in which the first and second matrix display panels include an electrically active component positioned adjacent each of the first and second pixel components.

15. The panel assembly of claim 14 in which the electrically active component positioned adjacent each pixel component includes a thin film transistor.

16. The panel assembly of claim 10 further comprising a noncoherent light source from which the light directed through the array of pixels propagates.

17. The panel assembly of claim 1 in which the converging microlens structure includes a pair of face-to-face microlens panels.

* * * * *